United States Patent [19]
Flanigan et al.

[11] 3,771,916
[45] Nov. 13, 1973

[54] PUFFER POWER PLANT
[75] Inventors: Eugene E. Flanigan, Carmel; Roger W. Merriman, Indianapolis, both of Ind.
[73] Assignee: General Motors Corporation, Detroit, Mich.
[22] Filed: Mar. 20, 1972
[21] Appl. No.: 236,328

[52] U.S. Cl. ........ 417/319, 60/39.16 R, 60/39.18 C, 180/66 A, 417/374
[51] Int. Cl. ............................................. F04b 9/00
[58] Field of Search ............... 60/39.18 C, 39.16 R, 60/39.33, 39.51 R; 417/47, 16, 381, 319, 374; 180/66 A, 66 B, 53 R

[56] References Cited
UNITED STATES PATENTS
3,609,967  10/1971  Waldmann ................ 60/39.18 C
3,635,019  1/1972  Kronogard .................. 60/39.16
3,237,404  3/1966  Flanigan et al. ............. 60/39.16
3,587,766  6/1971  Slade ............................ 180/66 A
3,418,806  12/1968  Wagner et al. ............ 60/39.51 R
3,514,945  6/1970  Austin ........................... 60/39.16

Primary Examiner—Carlton R. Croyle
Assistant Examiner—Warren Olsen
Attorney—Paul Fitzpatrick et al.

[57] ABSTRACT

A vehicle-powering gas turbine of the gas-coupled type includes a power transfer clutch between the gas generator turbine and the power turbine of the engine. To use the power plant for blowing air for such purposes as unloading powdered cargo, a bleed from the outlet of the engine compressor is opened and the power turbine is decoupled from the vehicle power transmission and drive wheels and coupled to the gas generator turbine by the power transfer clutch.

4 Claims, 2 Drawing Figures

PUFFER POWER PLANT

Our invention is directed to the provision of a gas turbine engine particularly suited to provide shaft output power for such purposes as driving a vehicle such as a truck or tractor-trailer combination, for example, and also for supplying air under pressure in considerable quantities for desired purposes, such as for blowing particulate cargo from such a vehicle.

It is well known that compressed air may be derived from the compressor of a gas turbine, whether a turbojet, turboprop, or turboshaft engine. However, no substantial amount of air may be bled from the ordinary gas turbine without seriously upsetting the energy balance of the engine. If a shaft driving gas turbine engine is properly balanced to deliver the maximum shaft power output under maximum permissible turbine inlet temperature, it is not possible to bleed a great proportion of the air from the compressor of the engine. The bleeding causes a mismatch of the turbine and compressor and there is insufficient motive fluid to drive the turbine under the compressor load. In a gas turbine solely for the purpose of pumping air, the compressor-driving turbine is intended to extract all possible energy from the air compressed in the compressor and heated in the engine combustion apparatus, and the system is balanced for use with the relatively large diversion of air from the compressor-combustor-turbine circuit.

There are circumstances in which it is desirable for a gas turbine to be adaptable both to providing shaft power and to supplying substantial quantities of compressed air. One of these is use with a vehicle which is driven by the gas turbine power plant and which is adapted to haul a powdered, particulate, or granular cargo which may be discharged from the vehicle by an airlift system. This may be the case whether the vehicle is a tractor-trailer outfit or other vehicle, including boats.

It has been proposed in the past to provide compressed gas for discharging such cargo by using the exhaust of a reciprocating engine, by employing air driven by an auxiliary compressor separate from the vehicle power plant, and by pumping air with a compressor driven by a turbine powered by the exhaust from a reciprocating engine; this last is disclosed in U.S. Pat. No. 3,495,766 of Hinkle, Feb. 19, 1970. British Pat. No. 736,318 of Collins, Sept. 7, 1955 and U.S. Pat. No. 2,769,500 of Clifford, Nov. 6, 1956 propose bleeding compressed air from gas turbines installed in motor vehicles.

Our invention is directed to the use of the compressor of a gas turbine power plant adapted for vehicle propulsion as a means for providing compressed air for blowing cargoes or other purposes. Briefly stated, in our invention the power turbine of such an engine is coupled to the gas generator turbine for supply of energy from the power turbine to the gas generator turbine at the time the engine is used for pumping air.

The engine may be of a well known type such as those described in Collman et al. U.S. Pat. No. 3,267,674 issued Aug. 23, 1966 or Bell U.S. Pat. No. 3,490,746 issued Jan. 20. 1970. Such engines include a power transfer mechanism which provides for clutching the gas generator and power turbines together, this power transfer being the subject of Flanigan et al. U.S. Pat. No. 3,237,404 issued Mar. 1, 1966.

The power transfer system of the Flanigan et al. patent was conceived of primarily as a means to transfer power from the gas generator turbine to the power turbine to improve efficiency of the power plant at part loads. It also serves as means to transfer power from the power turbine to the gas generator turbine to prevent runaway of the power turbine when decoupled from the load and to provide dynamic braking of the vehicle propelled by the engine.

The principal objects of our invention are to provide an improved power plant for vehicle propulsion and supply of compressed air, to utilize a coupling between the gas generator turbine and power turbine in a gas-coupled gas turbine engine as a means for augmenting the input to the engine compressor for the purpose of bleeding air from the compressor for use outside the power plant and, in general, to provide a simple bleed air or compressed air supply feature in a vehicle propulsion power plant without substantial modification of the power plant or prejudice to its utility as a vehicle propulsion power plant.

The nature of our invention and its advantages will be clear to those skilled in the art from the succeeding detailed description of preferred embodiments and the accompanying drawings.

Figures 1, 2:
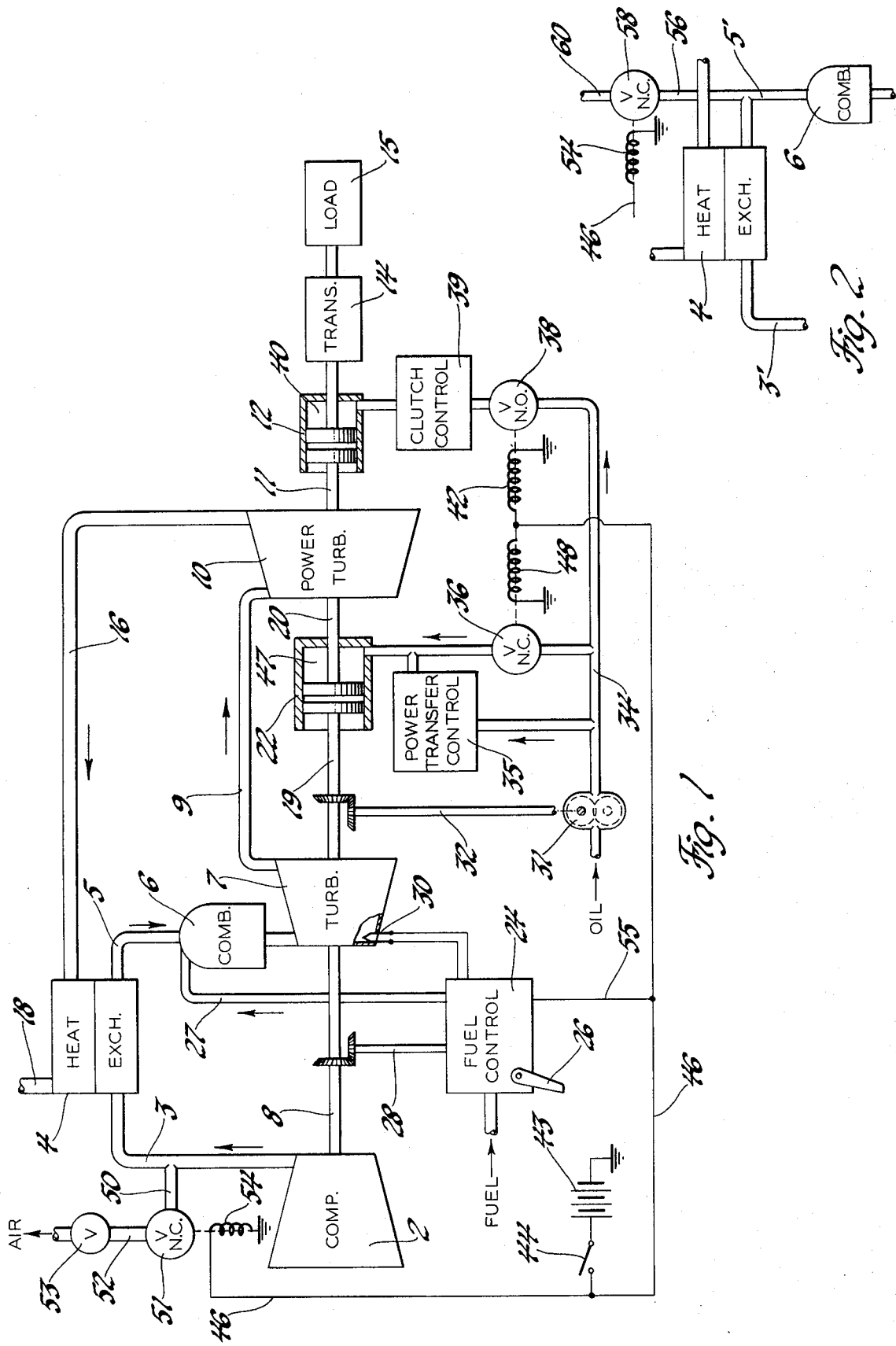
FIG. 1 is a schematic diagram of a gas turbine power plant incorporating the invention.
FIG. 2 is a partial schematic diagram illustrating a modification.

Referring to FIG. 1, a compressor 2 receives atmospheric air and discharges it through a conduit 3 to one pass of a heat exchanger 4 in which the air is heated by heat exchange from the engine exhaust. The heat compressed air then flows through conduit 5 to combustion apparatus 6 in which fuel is burned, and the resulting combustion products are supplied to a high pressure turbine 7 which is connected through a draft 8 to drive compressor 2. The compressor, combustion apparatus, and turbine constitute a gas generator. The exhaust from turbine 7 is supplied through ducting 9 as illustrated to the power turbine 10. The power turbine drives a power output shaft 11, illustrated as connected through a clutch 12 to a transmission 14 and so to a load 15 which may be vehicle driving wheels. The clutch may, of course, be a part of the transmission 14, and the transmission may be a manually shiftable gearbox or some form of automatic transmission. The exhaust from the power turbine flows through ducting 16, through the other pass of heat exchanger 4, and to an exhaust pipe 18.

The heat exchanger 4 may be omitted, but it is a highly desirable feature in such power plants. A shaft 19 driven by the gas generator turbine and a shaft 20 driven by the power turbine may be coupled for transmission of power by means indicated schematically as a clutch 22. As described in the patents mentioned above, ordinarily the power turbine operates at somewhat lower speed than the gas generator turbine so that the actual connection between the two involves some gearing. The details of this are immaterial to our present invention.

The operation of the engine is controlled by a fuel control 24 which may be regulated by an arm 26 connected, for example, to a foot throttle or hand throttle control in the vehicle. Fuel is supplied under pressure by a suitable pump (not illustrated) to the fuel control, which meters the desired quantity of fuel to the engine to assure operation at the desired power level and prevent overspeed, overtemperature, and so on, as is well known to those skilled in the art. The fuel is supplied from the fuel control to the combustion apparatus through a fuel line 27. The fuel control receives an input of gas generator speed through a shaft 28 driven by shaft 8 and an input of gas generator turbine inlet temperature from a thermocouple 30. It may receive other inputs which are immaterial to the present discussion.

In the illustrated embodiment, the clutches 12 and 22 are engaged by oil under pressure, and the basic elements of one suitable oil system are illustrated in FIG. 1. An oil pump 31 which takes oil from a suitable sump is driven by shaft 32 from the gas generator turbine. Pump 31 may supply oil through lines 34 to a power transfer control 35, to a normally closed valve 36, and to a normally open valve 38. The normally open valve 38 is disposed ahead of a clutch control 39 which controls supply of clutch engaging oil to the hydraulic cylinder 40 of clutch 12. Supply of oil to this cylinder causes the plates of the clutch to engage and transmit power. As previously mentioned, the clutch 12 may be a part of the power transmission 14 and the clutch control 39 a part of the control of such transmission. Automatic transmissions have some provision to shift them into neutral so that the engine is decoupled from the load. Alternatively, a valve connected to dump oil from the clutch 12 when energized might be used.

Valve 38 may be closed by a solenoid 42 energized from the vehicle power supply, represented by battery 43, through a manually operable switch 44. Switch 44 energizes a line 46 to energize solenoid 42 and close valve 38, which interrupts supply of engaging oil to clutch 12, causing it to become disengaged. Obviously, more sophisticated schemes for control of the clutch may be present, or the clutch may be simply disengaged manually when desired.

The power transfer control 35 may operate generally as described in the above-mentioned Flanigan et al. patent to control supply of oil under pressure to an engaging cylinder 47 of the clutch 22. The normally closed valve 36 may be opened by a solenoid 48 energized from line 46 as one possible means to provide a supply of oil under pressure from pump 31 to the engaging cylinder 47 to couple the two turbines together regardless of the operation of the power transfer control 35. If the power transfer clutch automatically engages when power turbine 10 overspeeds, valve 36 will not be required. When the throttle is advanced and clutch 12 is disengaged, clutch 22 will engage, as described in the Flanigan et al. patent.

As illustrated, the bleed air system includes a branch line 50 from the compressor discharge conduit 3 which is connected through a normally closed valve 51 to the compressed air delivery line 52. Valve 51 is shown as opened by a solenoid 54 energized through line 46 from the switch 44. Normally, some controllable valve, indicated at 53, will be disposed at the point of use of the air.

It will be seen, therefore, that closing of switch 44 interrupts transmission of power from the power turbine to the transmission and drive wheels, couples the power turbine to the gas generator turbine through clutch 22, and opens valve 51 to allow delivery of air to the supplied device, which is not illustrated here. Clearly, it is not essential for all of these controls to be coupled to a single actuating device such as switch 44, but this is a suitable and convenient way to accomplish the desired result. It is desirable to have an interlock to prevent opening air valve 51 unless the power transfer clutch is engaged or will engage automatically as explained above.

With the two turbines so coupled, the power extracted from the gas generator turbine exhaust by the power turbine makes available sufficient power to drive the compressor notwithstanding the loss of air to the discharge circuit. About one-fourth of the air compressed may be bled.

A specific operative embodiment of the invention, in an engine rated at 280 shaft horsepower and having an airflow rating of 4 pounds per second, is capable of pumping 1 pound per second of air at 25 psig at 1700°F. turbine inlet temperature. This is accomplished at about 90 percent full rated turbine speed. The engine may be governed at the desired speed through the governing means in the fuel control operated through shaft 28.

FIG. 2 illustrates a possible modification of the engine. In FIG. 2 the system may be as illustrated in FIG. 1 except that FIG. 2 illustrates means to derive bleed air from the engine which has been heated in the heat exchanger 4. There may be situations in which a supply of quite hot air would be desired for some purpose. In this case, the conduit 3' from the compressor feeds the compressed air through one pass of heat exchanger 4 into a duct 5' leading to the combustion apparatus 6. A branch duct 56 from duct 5' leads through normally closed valve 58, opened by the solenoid 54 of FIG. 1, and permitting discharge of hot compressed air through a discharge line 60. It will be appreciated, of course, that the air delivered by the compressor is reasonably warm from compression and thus in most cases the additional heating will not be needed or even desirable.

In practice, in either version of the system, the control may be simplified when the power transfer control includes means for automatically coupling the power turbine to the gas generator if the power turbine overspeeds. In this case, disengagement of the normal load will lead to overspeed of the power turbine and engagement of the clutch 22 when the gas generator is operating.

It should be clear from the foregoing to those skilled in the art that the engine and system described herein is particularly well suited to meet the objectives of providing propulsion for a vehicle or shaft power for other purposes and providing compressed air for any desired purpose. Some of the purposes for which such compressed air may be used includes expelling from a tank trailer pulverized or liquid cargo such as cement, fly ash, liquid fertilizers, small grains, fuel oils and hot distillates, plastic pellets, etc. The bled air could also be used for operation of an air motor for driving any form of auxiliary device such as a pump, compressor, generator, or alternator.

The detailed description of the preferred embodiments of the invention for the purpose of explaining the principles thereof is not to be considered as limiting or restricting the invention, since many modifications may be made by the exercise of skill in the art.

We claim:

1. A gas turbine power plant for alternatively powering a power output shaft and supplying air under pressure for auxiliary purposes comprising, in combination, an air compressor, combustion apparatus supplied by the compressor, a first turbine supplied with motive fluid by the combustion apparatus and coupled to drive the compressor, a second turbine rotatable independently of the first turbine and supplied by the combustion apparatus, the second turbine being connectable to drive the power output shaft; means for disconnecting the second turbine from the power output shaft and coupling the turbines for transfer of power from the second turbine to the first turbine; and means for bleeding air compressed by the compressor from the engine while the turbines are so coupled.

2. A gas turbine power plant for alternatively powering a vehicle and supplying air under pressure for blowing cargo from the vehicle comprising, in combination, an air compressor, combustion apparatus supplied by the compressor, a first turbine supplied with motive fluid by the combustion apparatus and coupled to drive the compressor, a second turbine rotatable independently of the first turbine and supplied by the combustion apparatus, the second turbine being connectable to drive the vehicle; means for disconnecting the second turbine from the vehicle drive and coupling the turbines for transfer of power from the second turbine to the first turbine; and means for bleeding air compressed by the compressor from the engine while the turbines are so coupled.

3. A gas turbine power plant for alternatively powering a vehicle and supplying air under pressure for auxiliary purposes comprising, in combination, an air compressor, combustion apparatus supplied by the compressor, a first turbine supplied with motive fluid by the combustion apparatus and coupled to drive the compressor, a second turbine rotatable independently of the first turbine and supplied by the combustion apparatus, the second turbine being connectable to drive the vehicle; a regenerator for heating the compressed air by the turbine exhaust; means for disconnecting the second turbine from the vehicle drive and coupling the turbines for transfer of power from the second turbine to the first turbine; and means for bleeding air compressed by the compressor and heated by the regenerator from the engine while the turbines are so coupled.

4. A gas turbine power plant for alternatively powering a vehicle and supplying air under pressure for auxiliary purposes comprising, in combination, an air compressor, combustion apparatus supplied by the compressor, a first turbine supplied with motive fluid by the combustion apparatus and coupled to drive the compressor, a second turbine rotatable independently of the first turbine and supplied by the combustion apparatus, the second turbine being connectable to drive the vehicle; means for disconnecting the second turbine from the vehicle drive and coupling the turbines for transfer of power from the second turbine to the first turbine; and means for bleeding air compressed by the compressor from the engine while the turbines are so coupled including interlock means effective to prevent bleeding air when the turbines are not so coupled.

* * * * *